US011850747B2

(12) United States Patent
Guo et al.

(10) Patent No.: US 11,850,747 B2
(45) Date of Patent: Dec. 26, 2023

(54) ACTION IMITATION METHOD AND ROBOT AND COMPUTER READABLE MEDIUM USING THE SAME

(71) Applicant: UBTECH ROBOTICS CORP LTD, Shenzhen (CN)

(72) Inventors: Miaochen Guo, Shenzhen (CN); Jun Cheng, Shenzhen (CN); Jingtao Zhang, Shenzhen (CN); Shuping Hu, Shenzhen (CN); Dong Wang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 427 days.

(21) Appl. No.: 17/112,569

(22) Filed: Dec. 4, 2020

(65) Prior Publication Data
US 2021/0170580 A1    Jun. 10, 2021

(30) Foreign Application Priority Data

Dec. 4, 2019    (CN) .......................... 201911227303.6

(51) Int. Cl.
| | |
|---|---|
| *B25J 9/16* | (2006.01) |
| *B25J 19/02* | (2006.01) |
| *G06N 3/08* | (2023.01) |

(52) U.S. Cl.
CPC ............. *B25J 9/161* (2013.01); *B25J 9/1697* (2013.01); *B25J 19/023* (2013.01); *G06N 3/08* (2013.01)

(58) Field of Classification Search
CPC ........ B25J 9/1697; B25J 19/023; B25J 9/161; G06N 3/08
See application file for complete search history.

(56) References Cited

U.S. PATENT DOCUMENTS

| | | | | |
|---|---|---|---|---|
| 10,198,832 | B2* | 2/2019 | De Fauw | G06T 11/003 |
| 2018/0029226 | A1* | 2/2018 | Dani | B25J 9/163 |
| 2020/0290203 | A1* | 9/2020 | Taylor | B25J 9/163 |

OTHER PUBLICATIONS

A. Toshev and C. Szegedy, "DeepPose: Human Pose Estimation via Deep Neural Networks," 2014 IEEE Conference on Computer Vision and Pattern Recognition, Columbus, OH, USA, 2014, pp. 1653-1660, doi: 10.1109/CVPR.2014.214. (Year: 2014).*

(Continued)

*Primary Examiner* — Jeff A Burke
*Assistant Examiner* — Joshua Alexander Garza

(57) ABSTRACT

The present disclosure provides an action imitation method as well as a robot and a computer readable storage medium using the same. The method includes: collecting a plurality of action images of a to-be-imitated object; processing the action images through a pre-trained convolutional neural network to obtain a position coordinate set of position coordinates of a plurality of key points of each of the action images; calculating a rotational angle of each of the linkages of the to-be-imitated object based on the position coordinate sets of the action images; and controlling a robot to move according to the rotational angle of each of the linkages of the to-be-imitated object. In the above-mentioned manner, the rotational angle of each linkage of the to-be-imitated object can be obtained by just analyzing and processing the images collected by an ordinary camera without the help of high-precision depth camera.

20 Claims, 7 Drawing Sheets

(56) References Cited

OTHER PUBLICATIONS

Jonathan Tompson, Murphy Stein, Yann LeCun, and Ken Perlin. 2014. Real-time continuous pose recovery of human hands using convolutional networks. ACM Trans. Graph. 33, 5. Article 169 (Aug. 2014) 10 pages. DOI: http://dx.doi.org/10.1145/2629500 (Year: 2014).*

S. D. Al-Sheekh and M. D. Younus, "Real-Time Pose Estimation for Human-Robot Interaction," 2020 2nd Annual International Conference on Information and Sciences (AiCIS), Fallujah, Iraq, 2020, pp. 86-90, doi: 10.1109/AiCIS51645.2020.00023., (Year: 2020).*

* cited by examiner

ACTION IMITATION METHOD AND ROBOT AND COMPUTER READABLE MEDIUM USING THE SAME

CROSS REFERENCE TO RELATED APPLICATIONS

The present disclosure claims priority to Chinese Patent Application No. 201911227303.6, filed Dec. 4, 2019, which is hereby incorporated by reference herein as if set forth in its entirety.

BACKGROUND

1. Technical Field

The present disclosure relates to robot technology, and particularly to an action imitation method as well as a robot and a computer readable storage medium, using the same.

2. Description of Related Art

In the prior art, humanoid robots to a certain extent can already motion by imitating human's motions so as to, for example, grasp, walk upright with two feet, or the like. However, they still appear blunt in imitating some human habitual motions and are not personified enough, hence it is necessary to have a method to directly transfer human motions to robots. The existing action imitation methods can be categorized into two types, one is wearable control device-based action imitation method, and the other is vision-based action imitation method. The first (wearable control device-based) method requires the user to wear a specific equipment to collect motion information of the joints of the human body of the user so as to synchronize to the corresponding joints of a humanoid robot. The data obtained by the first method is more accurate, but the shortcoming is also very obvious that the wearable control device have high production cost and maintenance cost, which is not suitable for mass popularization and the application scenarios are extremely limited because it is limited to laboratory operations while the processes of wearing and assembling/disassembling are cumbersome and poor in user experience. The second (vision-based) method can effectively improve the problems encountered by the first method because action imitations can be realized through a depth camera built into the humanoid robot or a depth camera disposed in the exterior environment without using additional equipment, which greatly expands the application scenarios. However, because the second method requires the help of a high-precision depth camera which has high cost, it is difficult to popularize.

BRIEF DESCRIPTION OF THE DRAWINGS

In order to more clearly illustrate the technical solutions in the embodiments of the present disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the term "including" (or "comprising") indicates the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
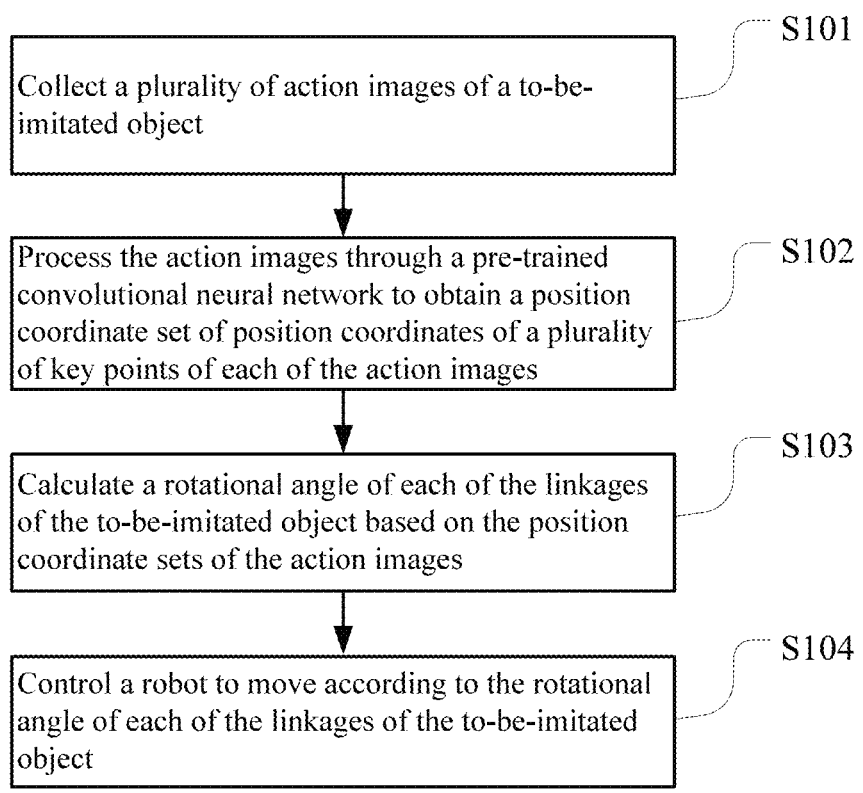
FIG. 1 is a flow chart of an embodiment of an action imitation method according to the present disclosure.
Figure 6:
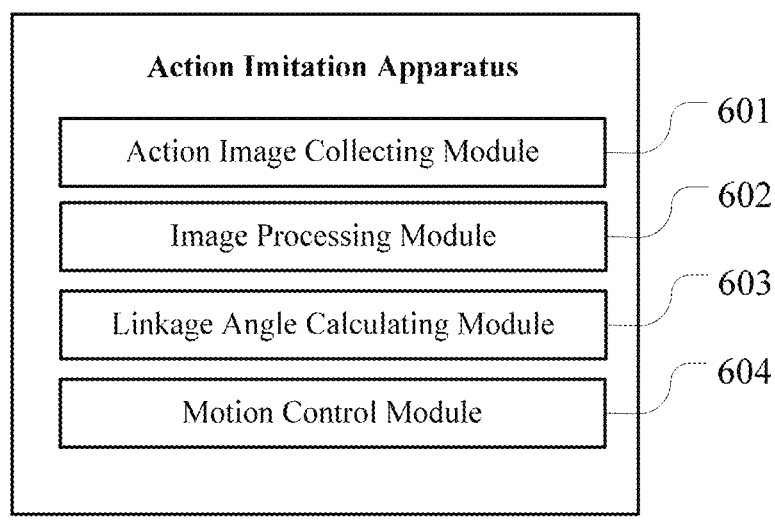
FIG. 6 is a schematic block diagram of an action imitation apparatus according to an embodiment of the present disclosure.
Figure 7:
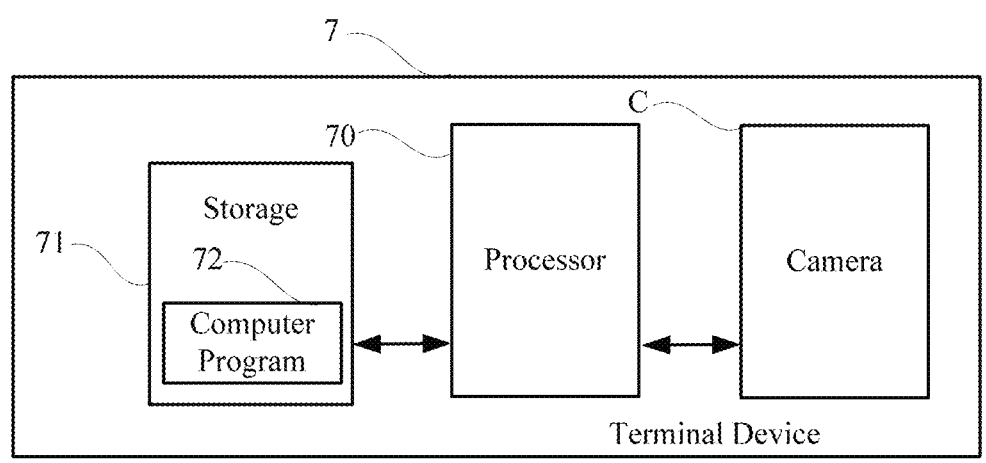
FIG. 7 is a schematic block diagram of a robot according to an embodiment of the present disclosure.

FIG. 1 is a flow chart of an embodiment of an action imitation method according to the present disclosure. In this embodiment, an action imitation method is provided. The method is a computer-implemented method executable for a processor, which may be implemented through an action imitation apparatus as shown in FIG. 6 or implemented through a robot as shown in FIG. 7. As shown in FIG. 1, the method includes the following steps.

S101: collecting a plurality of action images of a to-be-imitated object.

Figure 2:
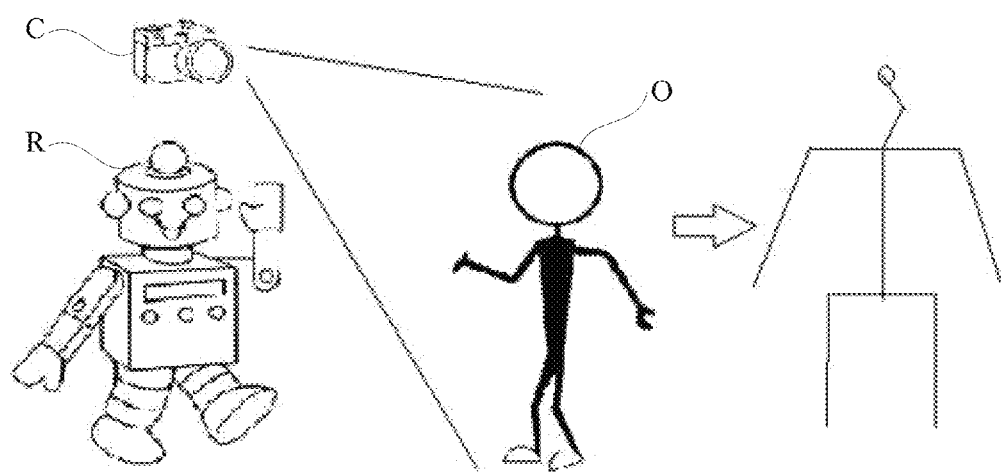
FIG. 2 is a schematic diagram of an application scenario according to the embodiment of FIG. 1.

FIG. 2 is a schematic diagram of an application scenario according to the embodiment of FIG. 1. As shown in FIG. 2, in this embodiment, the icon on the left represents a humanoid robot R which executes the action imitation method, and the icon on the middle represents an operator, that is, a to-be-imitated object O. The humanoid robot R can imitate the actions of the operator O. In other embodiments, the robot can be other type of robot such as robot dog.

In this embodiment, as an example, the action images of the to-be-imitated object O can be collected through a camera disposed on the humanoid robot R itself; as another example, the action images of the to-be-imitated object can be collected through an external camera C disposed at a designated location (as the icon on the upper left of FIG. 2). It should be noted that, the camera is an ordinary RGB camera, and the collected action images are two-dimensional RGB images, which are images composed of three color channels of red (R), green (G), and blue (B). The size of the action image can be set according to actual needs, for example, it can be set to 456 pixels×256 pixels, while it can also be set to other sizes, which is not limited herein.

S102: processing the action images through a pre-trained convolutional neural network to obtain a position coordinate set of position coordinates of a plurality of key points of each of the action images.

Figure 3:
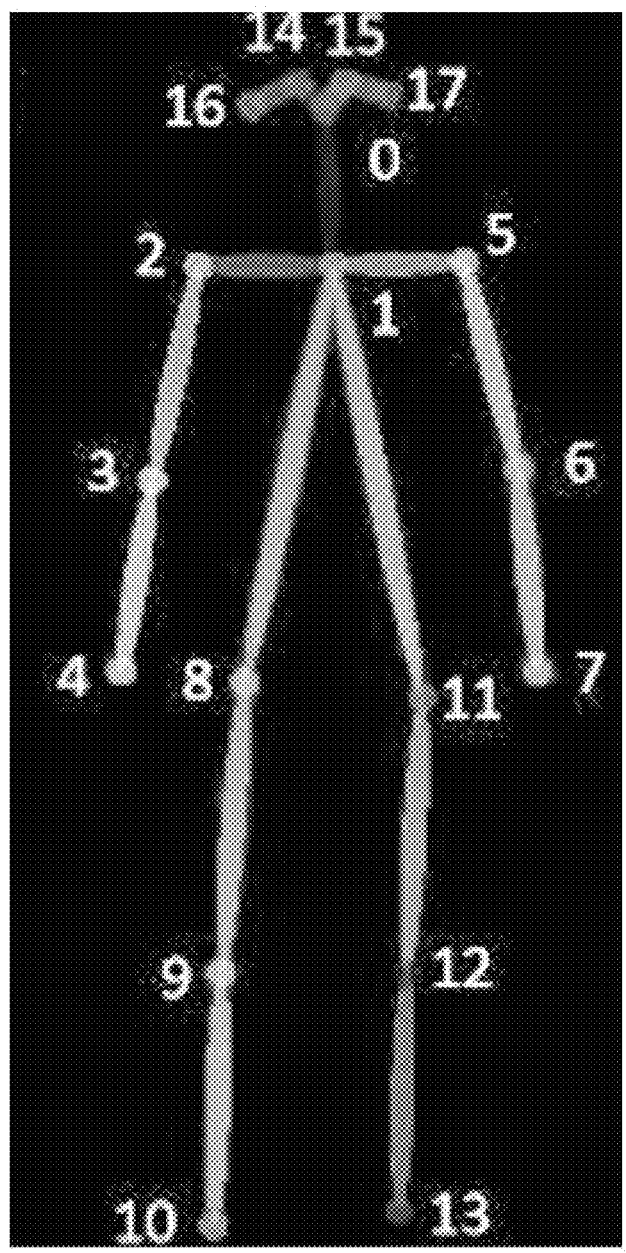
FIG. 3 is a schematic diagram of each key point according to the embodiment of FIG. 1.

In this embodiment, each position coordinate set includes two-dimensional position coordinates of each key point of an action image. FIG. 3 is a schematic diagram of each key point according to the embodiment of FIG. 1. In which, the two-dimensional position coordinates of 18 key points shown in the figure can be denoted in sequence as: key point 0: $(X_0, Y_0)$, key point 1: $(X_1, Y_1)$, key point 2: $(X_2, Y_2)$, ..., key point 16: $(X_{16}, Y_{16})$, and key point 17: $(X_{17}, Y_{17})$.

In this embodiment, the convolutional neural network may be any existing convolutional neural network. As an example, a convolutional neural network designed by combining a convolutional pose machine (CPM) and a heatmap can be used. The convolutional neural network can be trained in two stages from coarse to fine, where the backbone network uses resnet 18, and the network structure is pruned and trimmed so that it can achieve real-time processing of the processor of the humanoid robot while ensuring that the accuracy will not lost too much.

Figure 4:
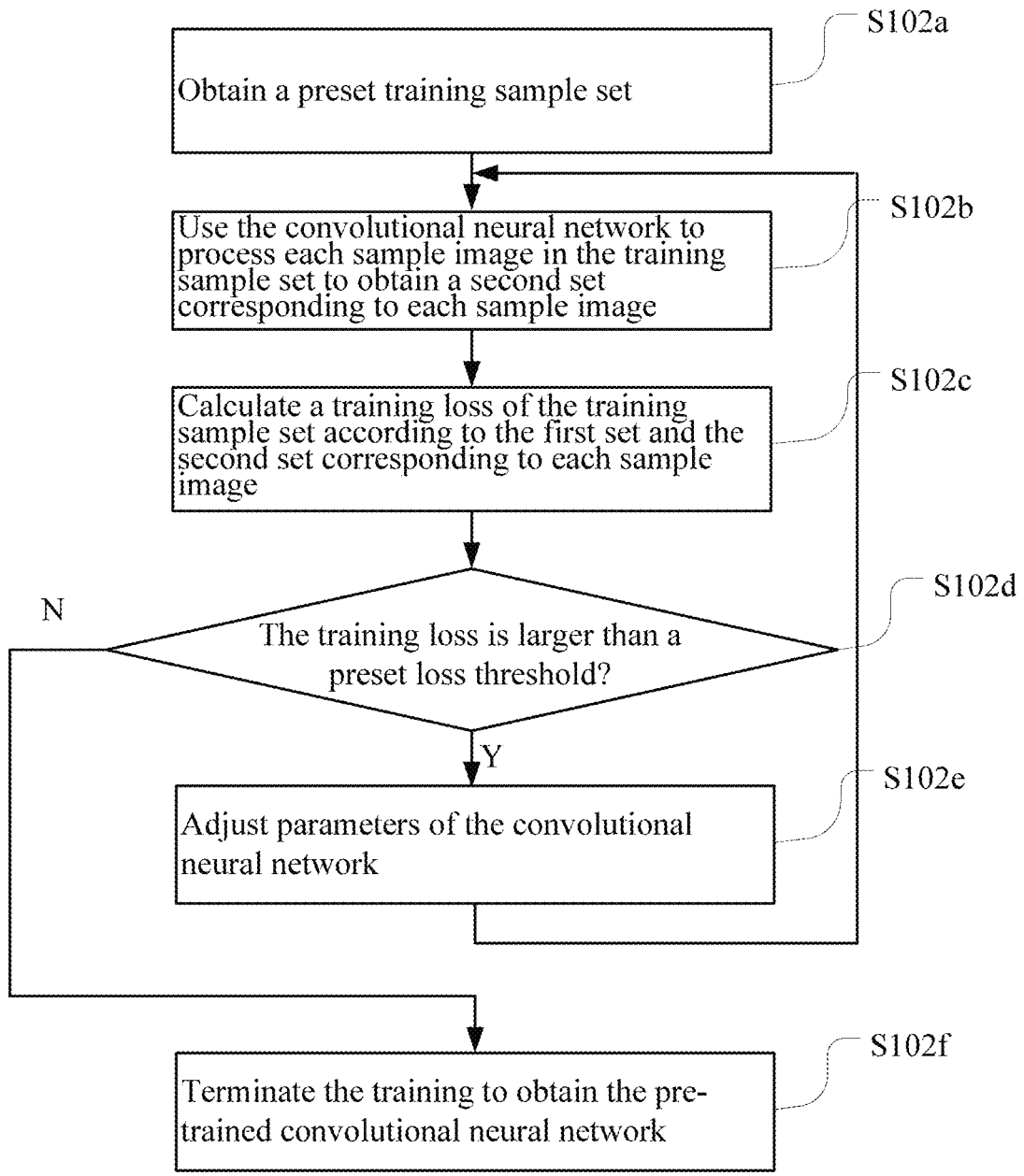
FIG. 4 is a flow chart of training a convolutional neural network according to the embodiment of FIG. 1.

In this embodiment, the convolutional neural network is trained through the process shown in FIG. 4 in advance:

S102a: obtaining a preset training sample set.

The training sample set includes N sample images (N is a positive integer), and each sample image corresponds to one pre-labeled position coordinate set denoted as a first set herein. The first set can be stored as a JSON (JavaScript object notation) file that includes the two-dimensional position coordinates of each key point in the corresponding sample image. The training sample set can use various public image data sets including but not limited to MSCOCO, ImageNet, Open Images Dataset, CIFAR-10 or other image data sets.

S102b: using the convolutional neural network to process each sample image in the training sample set to obtain a second set corresponding to each sample image.

For each sample image, the corresponding second set also includes two-dimensional position coordinates of each key point in the sample image. But it should be noted that, the first set is the labeled expected output, and the second set is the actual output.

S102c: calculating a training loss of the training sample set according to the first set and the second set corresponding to each sample image.

As an example, a second-order Gaussian function processing is performed on each of the position coordinate of each key point of the first set and the second set to obtain a Gaussian heat map at the position coordinate of each key point, and training losses of all pixels within the Gaussian heat map at the position coordinate of each key point of the first set and the Gaussian heat map at the position coordinate of the key points corresponding to the second set are calculated to take as the training loss of the training sample set.

S102d: determining whether the training loss is larger than a preset loss threshold.

The value of the loss threshold can be set according to actual needs. If the training loss is larger than the loss threshold, step S102e is executed; otherwise, if the training loss is less than or equal to the loss threshold, step S102f is executed.

S102e: adjusting parameters of the convolutional neural network.

After adjusting the parameter, return to step S102b, that is, start the next round of training.

In this embodiment, it is assumed that the parameters of the convolutional neural network in the initial state are W1, and the calculated training loss is used to adjust the parameter W1 of the convolutional neural network through backpropagation so as to obtain the adjusted parameters W2. After adjusting the parameters, continue to execute the step S102b of using the convolutional neural network to process each sample image in the training sample set, that is, start the next round of training. During the round of training, the second set corresponding to each sample image is obtained, and the training loss of the training sample set is calculated based on the first set and the second set corresponding to each sample image, and then the training loss is used to adjust the parameter W2 of the convolutional neural network through backpropagation to obtain the adjusted parameters W3, ..., and so on. The forgoing process is repeated continuously until the training loss is less than or equal to the loss threshold.

S102f: terminating the training to obtain the pre-trained convolutional neural network.

If the training loss is smaller than or equal to the loss threshold, it indicates that the convolutional neural network has converged, and the training can be terminated at this time, where the trained convolutional neural network is the pre-trained convolutional neural network.

After the pre-trained convolutional neural network is obtained, the pre-trained convolutional neural network can be used to process the action images, thereby obtaining the position coordinate set corresponding to the action images.

Furthermore, considering that the two-dimensional position coordinates of the key points in the position coordinate set that are output by the convolutional neural network may sometimes jump and cannot be directly applied to the robot, in this embodiment, after the two-dimensional position coordinates of each key point are obtained, a Kalman filtering can be performed on the two-dimensional position coordinates of each key point in the position coordinate set to obtain a filtered position coordinate set, so as to ensure its smoothness. Unless otherwise specified, the position coordinate set mentioned below refers to the filtered position coordinate set.

S103: calculating a rotational angle of each of the linkages of the to-be-imitated object based on the position coordinate sets of the action images.

First, a length of each of the linkages of the to-be-imitated object is calculated based on the position coordinate set.

Referring to FIG. 3, 17 linkages are shown, namely: (0,14), (0,15), (14,16), (15,17), (0,1), (1,2), (1,5), (2,3), (3,4), (5,6), (6,7), (1,8), (1,11), (8,9), (9,10), (11,12), and (12,13). In which, (0,14) represents the linkage between key point 0 and key point 14, by calculating the distance between key point 0 and key point 14, the length of the linkage (0,14) can be obtained; (0,15) represents the linkage between key point 0 and key point 15, by calculating the distance between key point 0 and key point 15, the length of the linkage (0,15) can be obtained; and so on.

Then, the rotational angle of each of the linkages of the to-be-imitated object can be calculated based on the length of each of the linkages of the to-be-imitated object and a preset maximum length of each of the linkages of the to-be-imitated object.

In an initialization process, the to-be-imitated object can make a flat pose (as shown in FIG. 3, but not limited to the illustrated pose) facing the camera in the first few frames, so as to obtain the maximum length of each linkage in these frames to use as a benchmark to determine the changes of the rotational angle of the linkage during the subsequent motions.

After calculating the length of each linkage of the to-be-imitated object, the rotational angle of each linkage of the to-be-imitated object can be calculated based on the following formula: calculating the rotational angle of each of the linkages of the to-be-imitated object based on the following formula:

$$\cos \theta_q = L_q / \mathrm{Max} L_q;$$

where, q is a serial number of each linkage, $0 \leq q \leq Q-1$, Q is the number of the linkages, $L_q$ is the length of the q-th linkage of the to-be-imitated object, and $\mathrm{Max}L_q$ is the maximum length of the q-th linkage of the to-be-imitated object, $\theta_q$ is the rotational angle of the q-th linkage of the to-be-imitated object.

Figure 5:
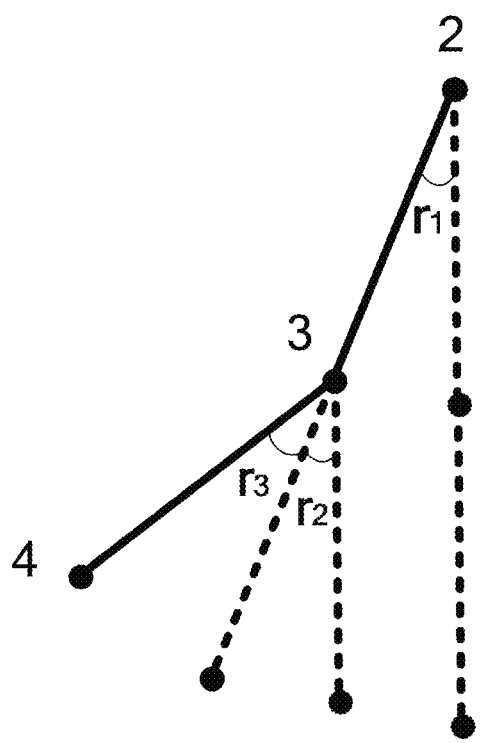
FIG. 5 is a schematic diagram of a jointly movement between linkages according to the embodiment of FIG. 1.

FIG. 5 is a schematic diagram of a jointly movement between linkages according to the embodiment of FIG. 1. Referring to FIG. 5, an example of a jointly movement between linkages is shown. The action is perpendicular to an image plane captured by the camera. Linkage (2,3) rotates by an angle $r_1$, and linkage (3,4) rotates by an angle $r_3$, accordingly. In the initialization process, the maximum length $\mathrm{Max}L_{(2,3)}$ of linkage (2,3) and the maximum length $\mathrm{Max}L_{(3,4)}$ of linkage (3,4) are obtained, and the length of the linkage (2,3) and that of the linkage (2,3) calculated according to the action image of the current frame are $L_{(2,3)}$ and $L_{(3,4)}$, respectively, then:

$$\cos r_1 = L_{(2,3)} / \mathrm{Max} L_{(2,3)};$$

$$\cos(r_2 + r_3) = L_{(3,4)} / \mathrm{Max} L_{(3,4)};$$

where, $r_2$ is the rotational angle of linkage (3, 4) when jointly move with linkage (2, 3), that is, $r_1 = r_2$.

S104: controlling the robot to move according to the rotational angle of each of the linkages of the to-be-imitated object.

Furthermore, considering that the calculated rotational angle of each of the linkages of the to-be-imitated object may sometimes jump and cannot be directly applied to the robot, in this embodiment, after the rotational angle of each of the linkages of the to-be-imitated object is obtained, a Kalman filtering can be performed on the rotational angle of each of the linkages of the to-be-imitated object to obtain a filtered rotational angle of each of the linkages, so as to ensure its smoothness. Finally, these rotational angles are mapped to the humanoid robot, and the robot is controlled to perform corresponding movements through its control system, so as to achieve the effect of imitating human actions.

In summary, in this embodiment, by collecting a plurality of action images of a to-be-imitated object; processing the action images through a pre-trained convolutional neural network to obtain a position coordinate set of position coordinates of a plurality of key points of each of the action images, where two adjacent ones of the key points are connected to form a plurality of linkages; calculating a rotational angle of each of the linkages of the to-be-imitated object based on the position coordinate sets of the action images; and controlling the robot to move according to the rotational angle of each of the linkages of the to-be-imitated object, the rotational angle of each linkage of the to-be-imitated object can be obtained by just analyzing and processing the images collected by an ordinary camera without the help of high-precision depth camera, and the robot can be controlled to move accordingly, which greatly reduces the required cost and can be easily popularized.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 6 is a schematic block diagram of an action imitation apparatus according to an embodiment of the present disclosure. In this embodiment, an action imitation apparatus corresponding to the action imitation method described in the forgoing embodiment is provided. As shown in FIG. 6, the action imitation apparatus includes:

an action image collecting module 601 configured to collect a plurality of action images of a to-be-imitated object;

an image processing module 602 configured to process the action images through a pre-trained convolutional neural network to obtain a position coordinate set of position coordinates of a plurality of key points of each of the action images, where two adjacent ones of the key points are connected to form a plurality of linkages;

a linkage angle calculating module 603 configured to calculate a rotational angle of each of the linkages of the to-be-imitated object based on the position coordinate sets of the action images; and a motion control module 604 configured to control the robot to move according to the rotational angle of each of the linkages of the to-be-imitated object.

Furthermore, the action imitation apparatus may further include:

a training sample set obtaining module configured to obtain a preset training sample set, where the training sample set comprises N sample images, and each sample image corresponds to a pre-labeled first set of the position coordinate of each key point, where N is a positive integer;

a sample image processing module configured to use the convolutional neural network to process each sample image in the training sample set to obtain a second set of the position coordinate of each key point corresponding to each sample image;

a training loss calculating module configured to calculate a training loss of the training sample set according to the first set and the second set corresponding to each sample image;

a parameter adjusting module configured to adjust parameters of the convolutional neural network and then returning to the step of using the convolutional neural network to process each sample image in the training sample set, in response to the training loss being larger than a preset loss threshold; and a training terminating module configured to terminate the training to obtain the pre-trained convolutional neural network, in response to the training loss being smaller than or equal to the loss threshold.

Furthermore, a second-order Gaussian function processing is performed on each of the position coordinate of each key point of the first set and the second set to obtain a Gaussian heat map at the position coordinate of each key point, and training losses of all pixels within the Gaussian heat map at the position coordinate of each key point of the first set and the Gaussian heat map at the position coordinate of the key points corresponding to the second set are calculated to take as the training loss of the training sample set.

Furthermore, the action imitation apparatus may further include:

a position coordinate filtering module configured to perform a Kalman filtering on two-dimensional position coordinates of each key point in the position coordinate set.

Furthermore, the linkage angle calculating module 603 may include:

a linkage length calculating unit configured to calculate a length of each of the linkages of the to-be-imitated object based on the position coordinate set; and a linkage angle calculating unit configured to calculate the rotational angle of each of the linkages of the to-be-imitated object based on the length of each of the linkages of the to-be-imitated object and a preset maximum length of each of the linkages of the to-be-imitated object.

Furthermore, the linkage angle calculating unit is configured to calculate the rotational angle of each of the linkages of the to-be-imitated object based on the following formula:

$$\cos \theta_q = L_q / \mathrm{Max} L_q;$$

where, q is a serial number of each linkage, $0 \le q \le Q-1$, Q is the number of the linkages, $L_q$ is the length of the q-th linkage of the to-be-imitated object, and $\mathrm{Max}L_q$ is the maximum length of the q-th linkage of the to-be-imitated object, $\theta_q$ is the rotational angle of the q-th linkage of the to-be-imitated object.

Furthermore, the action imitation apparatus may further include:

a joint angle filtering module configured to perform a Kalman filtering on the rotational angle of each of the linkages of the to-be-imitated object to obtain a filtered rotational angle of each linkage.

Those skilled in the art can clearly understand that, for the convenience and conciseness of the description, the specific working processes of the above-mentioned apparatus, modules and units can refer to the corresponding processes in the foregoing method embodiments, which will not be repeated herein.

In the above-mentioned embodiments, the description of each embodiment has its focuses, and the parts which are not described or mentioned in one embodiment may refer to the related descriptions in other embodiments.

FIG. 7 is a schematic block diagram of a robot according to an embodiment of the present disclosure. In this embodiment, a robot 7 is provided. For ease of description, only a part related to this embodiment is shown.

In this embodiment, as shown in FIG. 7, the robot 7 includes a processor 70, a storage 71, a computer program 72 stored in the storage 71 and executable on the processor 70, and a camera C. When executing (instructions in) the computer program 72, the processor 70 implements the steps in the above-mentioned embodiments of the action imitation method, for example, steps S101-S104 shown in FIG. 1. Alternatively, when the processor 70 executes (instructions in) the computer program 72, the functions of each module/unit in the above-mentioned device embodiments, for example, the functions of the modules 701-704 shown in FIG. 7 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented action imitation method for a robot, comprising steps of:
    collecting a plurality of action images of a to-be-imitated object;
    processing the action images through a pre-trained convolutional neural network to obtain a position coordinate set of position coordinates of a plurality of key points of each of the action images, wherein two adjacent ones of the key points are connected to form a plurality of linkages;
    calculating a rotational angle of each of the linkages of the to-be-imitated object based on the position coordinate sets of the action images; and
    controlling the robot to move according to the rotational angle of each of the linkages of the to-be-imitated object;
    wherein the step of calculating the rotational angle of each of the linkages of the to-be-imitated object based on the position coordinate sets of the action images comprises:
        calculating a length of each of the linkages of the to-be-imitated object based on the position coordinate set; and
        calculating the rotational angle of each of the linkages of the to-be-imitated object based on the length of each of the linkages of the to-be-imitated object and a preset maximum length of each of the linkages of the to-be-imitated object.

2. The method of claim 1, wherein before the step of processing the action images through the pre-trained convolutional neural network further comprises steps of:
    obtaining a preset training sample set, wherein the training sample set comprises N sample images, and each sample image corresponds to a pre-labeled first set of the position coordinate of each key point, where N is a positive integer;
    using the convolutional neural network to process each sample image in the training sample set to obtain a second set of the position coordinate of each key point corresponding to each sample image;
    calculating a training loss of the training sample set according to the first set and the second set corresponding to each sample image; and
    adjusting parameters of the convolutional neural network and then returning to the step of using the convolutional neural network to process each sample image in the training sample set, in response to the training loss being larger than a preset loss threshold.

3. The method of claim 2, wherein before the step of calculating the training loss of the training sample set according to the first set and the second set corresponding to each sample image comprises:

performing a second-order Gaussian function processing on each of the position coordinate of each key point of the first set and the second set to obtain a Gaussian heat map at the position coordinate of each key point; and calculating training losses of all pixels within the Gaussian heat map at the position coordinate of each key point of the first set and the Gaussian heat map at the position coordinate of the key points corresponding to the second set to take as the training loss of the training sample set.

4. The method of claim 1, wherein after the step of obtaining the position coordinate set of position coordinates of the plurality of key points of each of the action images further comprises a step of:

performing a Kalman filtering on two-dimensional position coordinates of each key point in the position coordinate set.

5. The method of claim 1, wherein the step of calculating the rotational angle of each of the linkages of the to-be-imitated object based on the length of each of the linkages of the to-be-imitated object and the preset maximum length of each of the linkages of the to-be-imitated object comprises:

calculating the rotational angle of each of the linkages of the to-be-imitated object based on the following formula:

$$\cos \theta_q = L_q / \mathrm{Max} L_q;$$

where, q is a serial number of each linkage, $0 \leq q \leq Q-1$, Q is the number of the linkages, $L_q$ is the length of the q-th linkage of the to-be-imitated object, and $\mathrm{Max}L_q$ is the maximum length of the q-th linkage of the to-be-imitated object, $\theta_q$ is the rotational angle of the q-th linkage of the to-be-imitated object.

6. The method of claim 1, wherein after the step of calculating the calculating the rotational angle of each of the linkages of the to-be-imitated object based on the position coordinate sets of the action images further comprises a step of:

performing a Kalman filtering on the rotational angle of each of the linkages of the to-be-imitated object.

7. A robot, comprising:

a memory;

a processor; and one or more computer programs stored in the memory and executable on the processor, wherein the one or more computer programs comprise:

instructions for collecting a plurality of action images of a to-be-imitated object;

instructions for processing the action images through a pre-trained convolutional neural network to obtain a position coordinate set of position coordinates of a plurality of key points of each of the action images, wherein two adjacent ones of the key points are connected to form a plurality of linkages;

instructions for calculating a rotational angle of each of the linkages of the to-be-imitated object based on the position coordinate sets of the action images; and instructions for controlling the robot to move according to the rotational angle of each of the linkages of the to-be-imitated object;

wherein the instructions for calculating the rotational angle of each of the linkages of the to-be-imitated object based on the position coordinate sets of the action images comprise:

instructions for calculating a length of each of the linkages of the to-be-imitated object based on the position coordinate set; and instructions for calculating the rotational angle of each of the linkages of the to-be-imitated object based on the length of each of the linkages of the to-be-imitated object and a preset maximum length of each of the linkages of the to-be-imitated object.

8. The robot of claim 7, wherein the one or more computer programs further comprise:

instructions for obtaining a preset training sample set, wherein the training sample set comprises N sample images, and each sample image corresponds to a pre-labeled first set of the position coordinate of each key point, where N is a positive integer;

instructions for using the convolutional neural network to process each sample image in the training sample set to obtain a second set of the position coordinate of each key point corresponding to each sample image;

instructions for calculating a training loss of the training sample set according to the first set and the second set corresponding to each sample image; and instructions for adjusting parameters of the convolutional neural network and then returning to the use the convolutional neural network to process each sample image in the training sample set, in response to the training loss being larger than a preset loss threshold.

9. The robot of claim 8, wherein the one or more computer programs further comprise:

instructions for performing a second-order Gaussian function processing on each of the position coordinate of each key point of the first set and the second set to obtain a Gaussian heat map at the position coordinate of each key point; and instructions for calculating training losses of all pixels within the Gaussian heat map at the position coordinate of each key point of the first set and the Gaussian heat map at the position coordinate of the key points corresponding to the second set to take as the training loss of the training sample set.

10. The robot of claim 7, wherein the one or more computer programs further comprise:

instructions for performing a Kalman filtering on two-dimensional position coordinates of each key point in the position coordinate set.

11. The robot of claim 7, wherein the instructions for calculating the rotational angle of each of the linkages of the to-be-imitated object based on the length of each of the linkages of the to-be-imitated object and the preset maximum length of each of the linkages of the to-be-imitated object comprise:

instructions for calculating the rotational angle of each of the linkages of the to-be-imitated object based on the following formula:

$$\cos \theta_q = L_q / \mathrm{Max} L_q;$$

where, q is a serial number of each linkage, $0 \leq q \leq Q-1$, Q is the number of the linkages, $L_q$ is the length of the q-th linkage of the to-be-imitated object, and $\mathrm{Max}L_q$ is the maximum length of the q-th linkage of the to-be-imitated object, $\theta_q$ is the rotational angle of the q-th linkage of the to-be-imitated object.

12. The robot of claim 7, wherein the one or more computer programs further comprise:

instructions for performing a Kalman filtering on the rotational angle of each of the linkages of the to-be-imitated object.

13. A non-transitory computer readable storage medium for storing one or more computer programs, wherein the one or more computer programs comprise:
   instructions for instructions for collecting a plurality of action images of a to-be-imitated object;
   instructions for processing the action images through a pre-trained convolutional neural network to obtain a position coordinate set of position coordinates of a plurality of key points of each of the action images, wherein two adjacent ones of the key points are connected to form a plurality of linkages;
   instructions for calculating a rotational angle of each of the linkages of the to-be-imitated object based on the position coordinate sets of the action images; and
   instructions for controlling the robot to move according to the rotational angle of each of the linkages of the to-be-imitated object;
   wherein the one or more computer programs further comprise;
   instructions for obtaining a preset training sample set, wherein the training sample set comprises N sample images, and each sample image corresponds to a pre-labeled first set of the position coordinate of each key point, where N is a positive integer;
   instructions for using the convolutional neural network to process each sample image in the training sample set to obtain a second set of the position coordinate of each key point corresponding to each sample image;
   instructions for calculating a training loss of the training sample set according to the first set and the second set corresponding to each sample image;
   instructions for adjusting parameters of the convolutional neural network and then returning to use the convolutional neural network to process each sample image in the training sample set, in response to the training loss being larger than a preset loss threshold;
   instructions for performing a second-order Gaussian function processing on each of the position coordinate of each key point of the first set and the second set to obtain a Gaussian heat map at the position coordinate of each key point; and
   instructions for calculating training losses of all pixels within the Gaussian heat map at the position coordinate of each key point of the first set and the Gaussian heat map at the position coordinate of the key points corresponding to the second set to take as the training loss of the training sample set.

14. The non-transitory computer readable storage medium of claim 13, wherein the one or more computer programs further comprise:
   instructions for performing a Kalman filtering on two-dimensional position coordinates of each key point in the position coordinate set.

15. The non-transitory computer readable storage medium of claim 13, wherein the instructions for calculating the rotational angle of each of the linkages of the to-be-imitated object based on the position coordinate sets of the action images comprise:
   instructions for calculating a length of each of the linkages of the to-be-imitated object based on the position coordinate set; and
   instructions for calculating the rotational angle of each of the linkages of the to-be-imitated object based on the length of each of the linkages of the to-be-imitated object and a preset maximum length of each of the linkages of the to-be-imitated object.

16. The non-transitory computer readable storage medium of claim 15, wherein the instructions for calculating the rotational angle of each of the linkages of the to-be-imitated object based on the length of each of the linkages of the to-be-imitated object and the preset maximum length of each of the linkages of the to-be-imitated object comprise:
   instructions for calculating the rotational angle of each of the linkages of the to-be-imitated object based on the following formula:

$\cos\theta_q = L_q/\mathrm{Max}L_q$;

where, q is a serial number of each linkage, $0 \leq q \leq Q-1$, Q is the number of the linkages, $L_q$ is the length of the q-th linkage of the to-be-imitated object, and $\mathrm{Max}L_q$ is the maximum length of the q-th linkage of the to-be-imitated object, $\theta_q$ is the rotational angle of the q-th linkage of the to-be-imitated object.

17. The non-transitory computer readable storage medium of claim 13, wherein the one or more computer programs further comprise:
   instructions for performing a Kalman filtering on the rotational angle of each of the linkages of the to-be-imitated object.

18. The non-transitory computer readable storage medium of claim 13, wherein the action images are collected through a camera disposed on the robot or an external camera disposed at a designated location.

19. The non-transitory computer readable storage medium of claim 13, wherein the action images are two-dimensional images composed of three color channels of red, green and blue.

20. The non-transitory computer readable storage medium of claim 13, wherein the first set are stored as a JavaScript object notation file.

* * * * *